United States Patent
Nemoto et al.

(10) Patent No.: US 7,099,076 B2
(45) Date of Patent: Aug. 29, 2006

(54) BINOCULARS WITH LIGHT-SHIELDING MECHANISM

(75) Inventors: Satoru Nemoto, Saitama-ken (JP); Ken Hirunuma, Tokyo (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 11/052,068

(22) Filed: Feb. 8, 2005

(65) Prior Publication Data

US 2005/0174634 A1 Aug. 11, 2005

(30) Foreign Application Priority Data

Feb. 9, 2004 (JP) .............................. 2004-032566

(51) Int. Cl.
*G02B 23/00* (2006.01)
*G02B 7/105* (2006.01)
*G02B 7/20* (2006.01)

(52) U.S. Cl. ...................... 359/416; 359/614
(58) Field of Classification Search ................ 359/407, 359/415–418, 473, 480
See application file for complete search history.

(56) References Cited

U.S. PATENT DOCUMENTS

| | | | | |
|---|---|---|---|---|
| 5,033,819 A | * | 7/1991 | Tanaka | 359/823 |
| 5,071,242 A | | 12/1991 | Yanagisawa | 359/416 |
| 5,115,350 A | * | 5/1992 | Tanaka | 359/823 |
| 5,196,959 A | | 3/1993 | Yanagisawa et al. | 359/415 |
| 5,305,141 A | | 4/1994 | Hotta | 359/416 |
| 5,583,692 A | | 12/1996 | Funatsu | 359/422 |
| 5,583,693 A | | 12/1996 | Funatsu | 359/425 |
| 5,913,081 A | * | 6/1999 | Okano et al. | 396/55 |
| 5,999,312 A | | 12/1999 | Funatsu | 359/407 |
| 6,024,457 A | * | 2/2000 | Kawai et al. | 359/611 |
| 6,134,048 A | * | 10/2000 | Kato et al. | 359/407 |
| 6,204,966 B1 | * | 3/2001 | Steinhuber | 359/407 |
| 6,226,123 B1 | | 5/2001 | Kanai et al. | 359/557 |
| 6,226,124 B1 | | 5/2001 | Enomoto et al. | 359/557 |
| 6,307,673 B1 | | 10/2001 | Hirunuma et al. | 359/416 |

FOREIGN PATENT DOCUMENTS

| | | |
|---|---|---|
| JP | 5107444 | 4/1993 |
| JP | 3090007 | 7/2000 |
| JP | 3196613 | 6/2001 |

OTHER PUBLICATIONS

English Language Abstract of JP 5-107444.
U.S. Appl. No. 11/052,042 to Nemoto et al., filed Feb. 8, 2005.
U.S. Appl. No. 11/052,041 to Nemoto et al., filed Feb. 8, 2005.
U.S. Appl. No. 11/052,051 to Nemoto et al., filed Feb. 8, 2005.
U.S. Appl. No. 11/052,040 to Nemoto et al., filed Feb. 8, 2005.

* cited by examiner

*Primary Examiner*—Mark A. Robinson
*Assistant Examiner*—Mark Consilvio
(74) *Attorney, Agent, or Firm*—Greenblum & Bernstein, P.L.C.

(57) ABSTRACT

There is provided binoculars which include a pair of observation optical systems each having an objective optical system, an erecting optical system and an eyepiece optical system. The binoculars include a focusing mechanism that is used to move a part of observation optical systems for focusing, a convergence value compensating mechanism that compensates for a convergence value by displacing displaceable optical elements which are at least parts of the objective optical systems, respectively, in association with actuation of the focusing mechanism, and a light shielding mechanism configured to shield light for preventing light from entering through a clearance caused in accordance with displacement of the displaceable optical elements by actuation of the convergence value compensating mechanism.

8 Claims, 9 Drawing Sheets

BINOCULARS WITH LIGHT-SHIELDING MECHANISM

BACKGROUND OF THE INVENTION

The present invention relates to binoculars.

When an object at infinity is observed by a pair of binoculars, a field of view observed by a left eye of an observer and a field of view observed by the right eye substantially overlap each other, and a single field of view is observed when the observer observes the binoculars with both eyes. When an object at a relatively short distance of several meters or less is observed with the binoculars, only a part of the field of view for each of the right eye and left eye overlaps each other, and the observer feels difficulty in observing such an object. This is because, in binoculars, the optical axes of left and right objective lenses are generally fixed to be parallel to each other since the binoculars are generally designed to observe an object located within a range from several tens of meters to infinity. If an object at a short distance is observed with such binoculars, a remarkable discrepancy arises between a focusing condition corresponding to the object (which will be referred to as an adjustment value, i.e., a distance to an object to be focused, for example, represented by a unit of diopter [dptr]=[1/meter]) and convergence value (which is a distance at which a right sight line and a left sight line cross, for example, represented by metric angle [MW]=[1/meter]). When an object is observed at high magnifying power, an influence due to such discrepancy is remarkable. For example, with ten-power binoculars, the degree of discrepancy is ten times in comparison with the degree of discrepancy of naked eyes. The remarkable discrepancy between the adjustment value and convergence value is a burden to the eyes of the observer and causes the eyes to be fatigued. (It should be noted that the term "convergence" means the visual axes of both eyes which are concentrated when observing an object at a short distance, and the angle formed between both axes is referred to as a "convergence angle").

In view of the above-described problem, in order to reduce the burden to the eyes when observing an object at a short distance, binoculars provided with a convergence value (convergence angle) compensating mechanism have been developed. In such binoculars, in accordance with the adjustment value, the convergence value (or convergence angle) is adjusted by moving both objective lenses in the direction orthogonal to the optical axes thereof to make the objective lenses located close to each other when observing an object at a short distance. Examples of such binoculars are disclosed in Japanese Patent Publications No. 3090007, No. 3196613 and No. 3189328. However, the structure of a convergence value compensating mechanism of the binoculars described in each of the patent publications is relatively complicated.

However, if the convergence value compensating mechanism is employed in binoculars, since the objective lenses are moved in a direction perpendicular to the optical axes thereof, clearances are formed beside the objective lenses. Then, straying light enters through the clearances, which may cause flare and have a bad influence such as lowering of contrast on an image formed by the binoculars.

SUMMARY OF THE INVENTION

The present invention is advantageous in that it provides binoculars capable of compensating for the convergence value in accordance with an adjustment value when an object at a short distance is observed, and further, capable of securely preventing the flare from being generated due to intrusion of straying light through the clearances which are produced as the optical elements are moved to compensate for the convergence value.

According to an aspect of the present invention, there is provided binoculars which include a pair of observation optical systems each having an objective optical system, an erecting optical system and an eyepiece optical system. The binoculars include a focusing mechanism that is used to move a part of observation optical systems for focusing, a convergence value compensating mechanism that compensates for a convergence value by displacing displaceable optical elements which are at least parts of the objective optical systems, respectively, in association with actuation of the focusing mechanism, and a light shielding mechanism configured to shield light for preventing light from entering through a clearance caused in accordance with displacement of the displaceable optical elements by actuation of the convergence value compensating mechanism.

With this configuration, since it is possible to correct the convergence value in accordance with an adjustment value in short-distance observation, it is possible to prevent a difference between the viewing field observed by the left eye and that observed by the right eye, and comfortable observation can be carried out. In addition, since the light shielding mechanism is provided, it is possible to prevent stray light from entering the observation optical system through a clearance produced in line with displacement of the displaceable optical elements for convergence value correction. Therefore, it is possible to securely prevent flare from being generated, and thereby it is possible to prevent adverse influences from occurring due to a lowering in the contrast resulting from flare, and satisfactory image formation can be secured at all times.

Optionally, the convergence value compensating mechanism may compensate for the convergence value by varying a distance between optical axes of the displaceable optical elements. In this case, the light shielding mechanism includes an outside light shielding portion that prevents light from entering through the clearance, the clearance being produced outside each of the displaceable optical elements, when facing in an optical axis direction of the displaceable optical elements, in a state in which the distance between the optical axes of the displaceable optical elements is comparatively small.

Still optionally, the outside light shielding portion may include a light shielding member configured to be displaced along with the displaceable optical elements.

Still optionally, the binoculars may include a main body that accommodates the displaceable optical elements, and the light shielding member may include a resilient body and is installed in contact with an inner wall of the main body. Alternatively, the light shielding member may include a bellow-shaped member and is installed in contact with an inner wall of the main body.

In a particular case, the convergence value compensating mechanism may compensate for the convergence value by varying a distance between optical axes of the displaceable optical elements. In this case, the light shielding mechanism may include an inside light shielding portion that prevents light from entering through the clearance, the clearance being produced between the displaceable optical elements, when facing in an optical axis direction of the displaceable optical elements, in a state in which the distance between the optical axes of the displaceable optical elements is comparatively large.

Optionally, the binoculars may include an integrated main body that accommodates the displaceable optical elements, and the inside light shielding portion may include a partition provided in the integrated main body. The displaceable optical elements are separated by the partition in spacing in which both the displaceable optical elements are displaced.

Still optionally, each of the pair of observation optical systems may be configured such that an incidence side optical axis with respect to the erecting optical system and an emission side optical axis of the eyepiece optical system are shifted from each other by a predetermined distance. In this case, The binoculars may include a main body that accommodates the displaceable optical elements, a left barrel containing the left eyepiece optical system and the left erecting optical system, the left barrel being turnable, with respect to the main body, about the left incidence side optical axis of the eyepiece optical system, and a right barrel containing the right eyepiece optical system and the right erecting optical system, the right barrel being turnable, with respect to the main body, about the right incidence side optical axis of the eyepiece optical system. The distance between the emission side optical axes of the pair of eyepiece optical systems is made adjustable by turning the left barrel and right barrel with respect to the main body.

Still optionally, the focusing mechanism may be configured to carry out focusing by moving the pair of displaceable optical elements. In this case, the binoculars may include a pair of guide shafts corresponding to the pair of displaceable optical elements, a pair of engaging portions formed on a pair of frames that hold the pair of displaceable optical elements, respectively; and a pair of guide rails provided with respect to the pair of displaceable optical elements, respectively. The pair of guide shafts are arranged in parallel with the corresponding displaceable optical elements. The pair of guide shafts guide the corresponding displaceable optical elements when moved by actuation of the focusing mechanism. The pair of guide shafts serve as turning centers of the corresponding displaceable optical elements, respectively. The pair of engaging portions are slidably engaged with the pair of guide rails, respectively. The pair of guide rails have inclined portions that incline with respect to the optical axes of the pair of displaceable optical elements at least parts thereof, respectively. In this structure, when the pair of displaceable optical elements are moved for focusing with the pair of engaging portions being engaged with the inclined portions of the pair of guide rails, respectively, the pair of displaceable optical elements turn about the pair of guide shafts, respectively, and a distance between the optical axes of the pair of displaceable optical elements changing as the pair of displaceable optical elements turn, whereby the convergence value is compensated.

Still optionally, the binoculars may include a main body that accommodates the displaceable optical elements. In this case, the light shielding mechanism may include light shielding members, which are respectively displaced along with the displaceable optical elements, for preventing light from entering through the clearance produced outside each of the displaceable optical elements, when facing in a direction parallel to an optical axis direction of the displaceable optical elements, in a state in which the distance between the optical axes of the displaceable optical elements is comparatively small. Each of the light shielding members may include an arc shape portion, whose outer circumferential shape has a form of an arc centering around the corresponding guide axis, in the vicinity of the farthest position from the corresponding guide axis, and the arc shape portion is brought into contact with or is in proximity to an inner wall of the main body.

BRIEF DESCRIPTION OF THE ACCOMPANYING DRAWINGS

DETAILED DESCRIPTION OF THE EMBODIMENTS

Hereinafter, binoculars according to embodiments of the present invention will be described in detail with reference to the accompanying drawings.

First Embodiment

Figure 1:
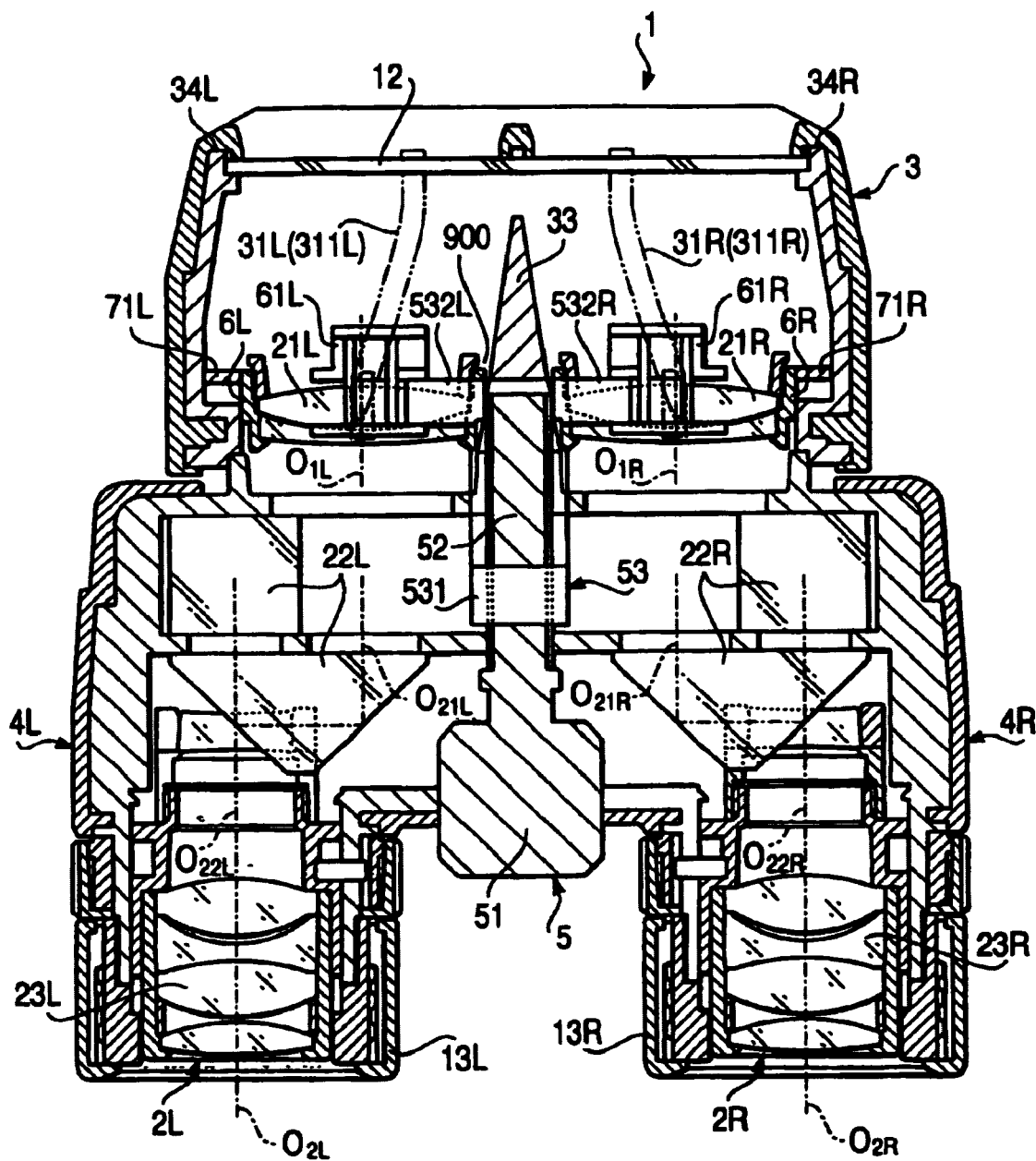
FIG. 1 is a sectional plan view of binoculars according to a first embodiment of the invention in an infinity-focused state.
Figure 2:
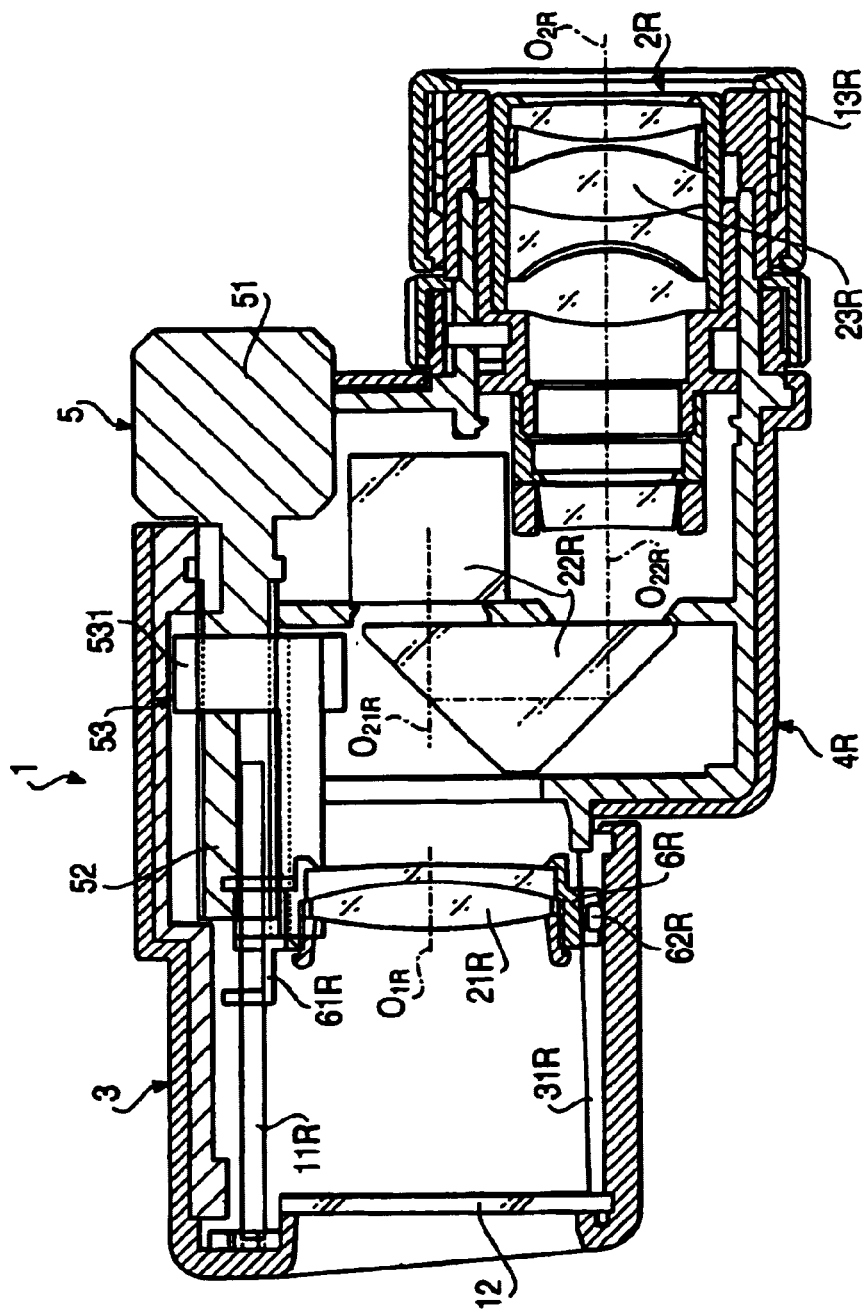
FIG. 2 is a sectional side view of the binoculars according to the first embodiment of the invention in an infinity-focused state.
Figure 3:
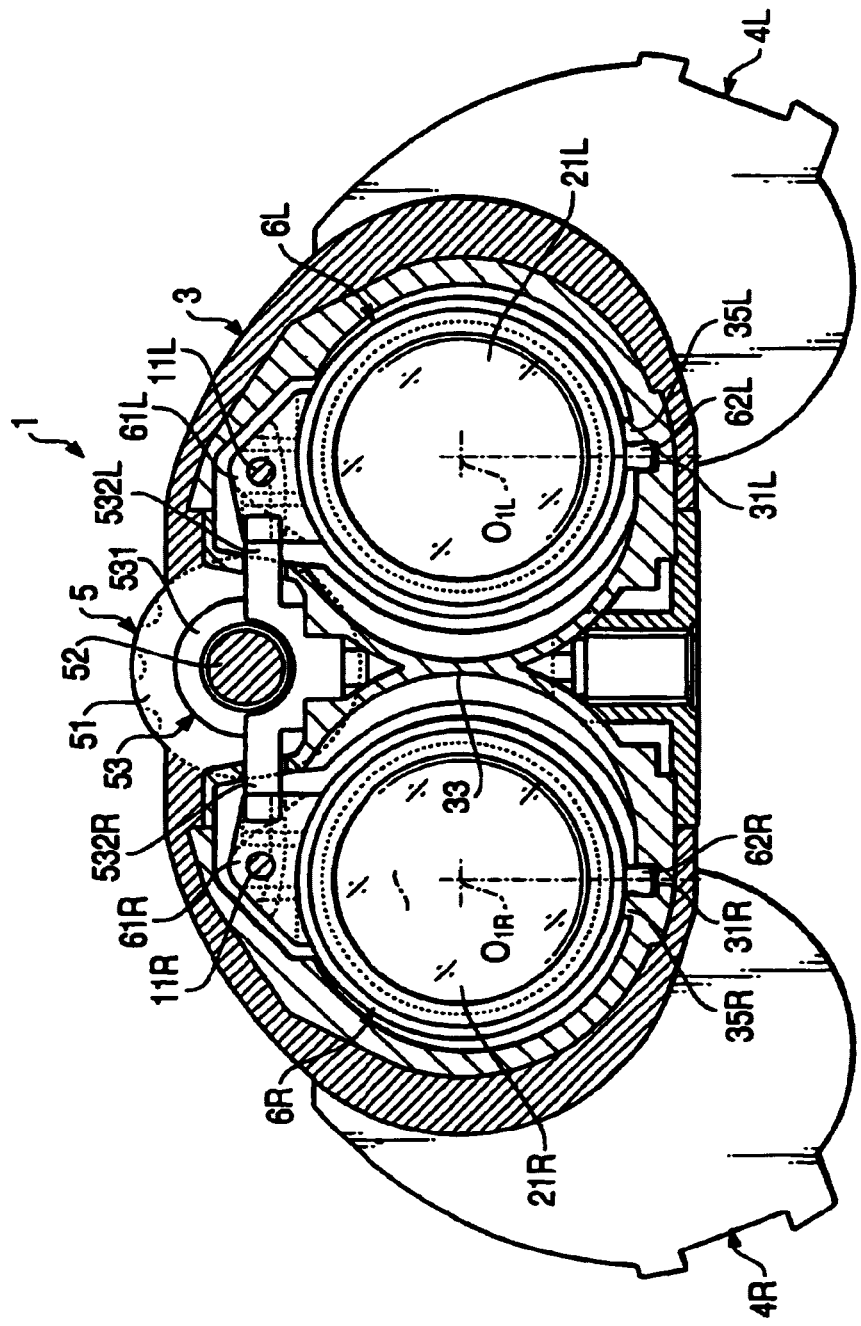
FIG. 3 is a sectional front view of the binoculars according to the first embodiment of the invention in an infinity-focused state.
Figure 4:
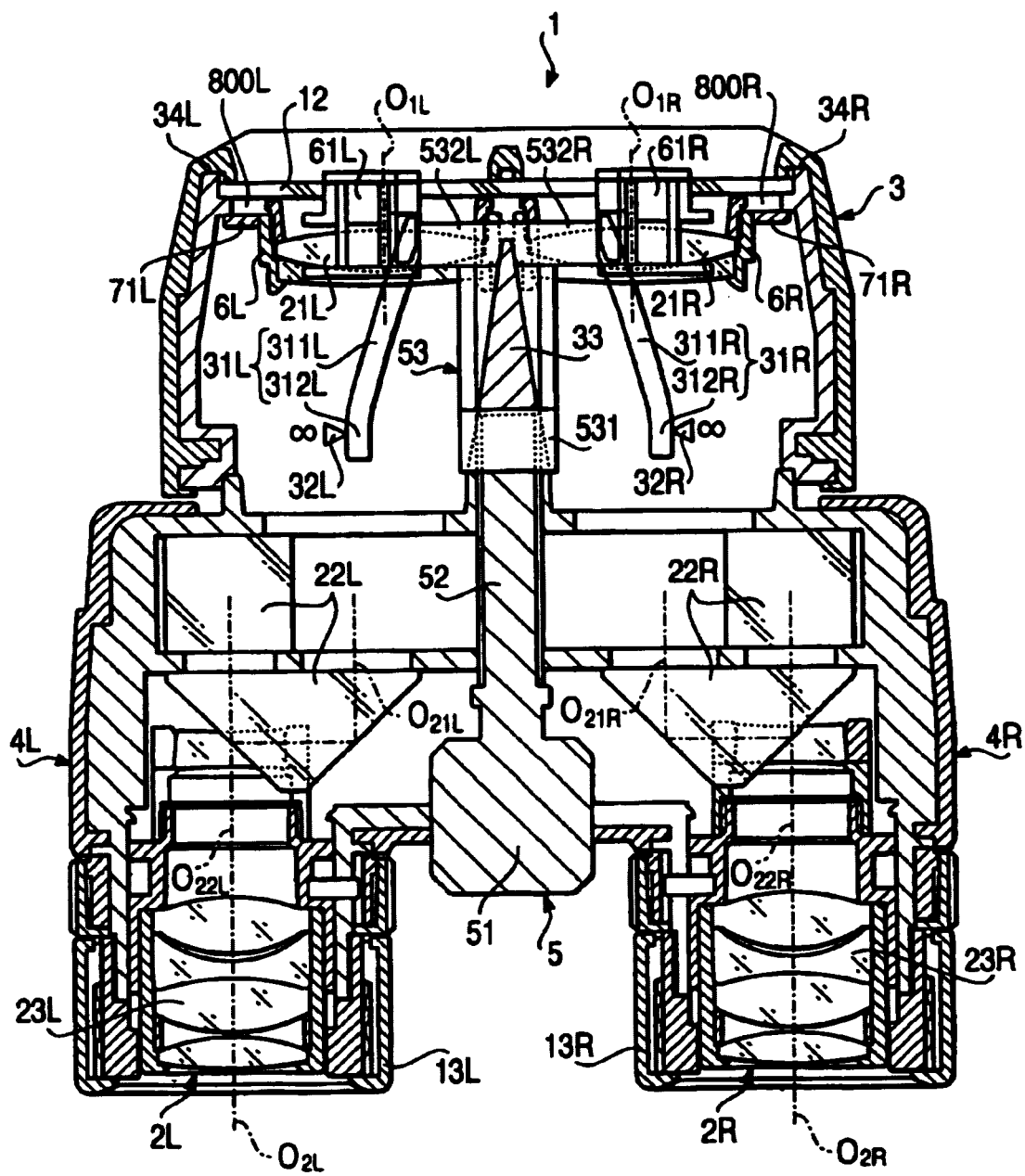
FIG. 4 is a sectional plan view of the binoculars according to the first embodiment of the invention in a shortest distance focused state.
Figure 5:
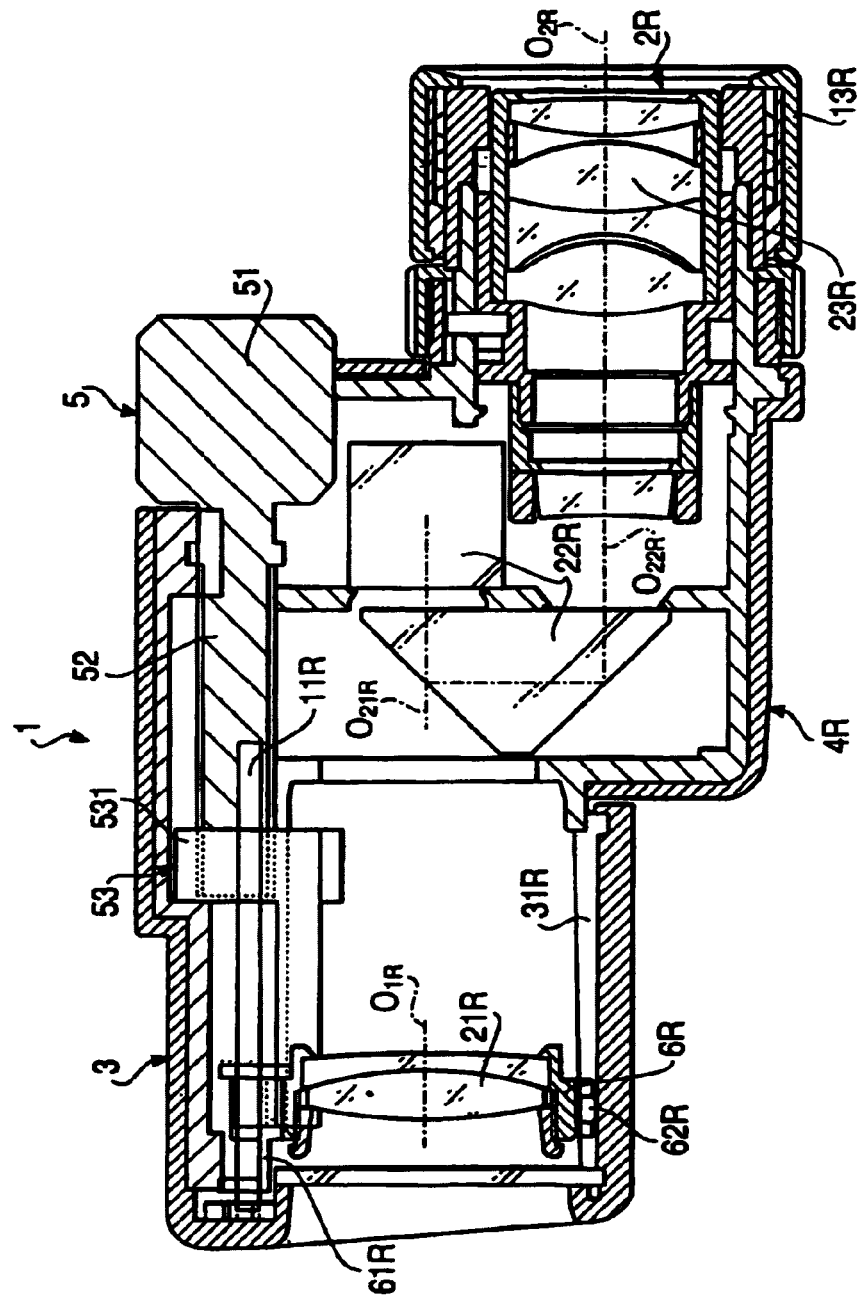
FIG. 5 is a sectional side view of the binoculars according to the first embodiment of the invention in a shortest distance focused state.
Figure 6:
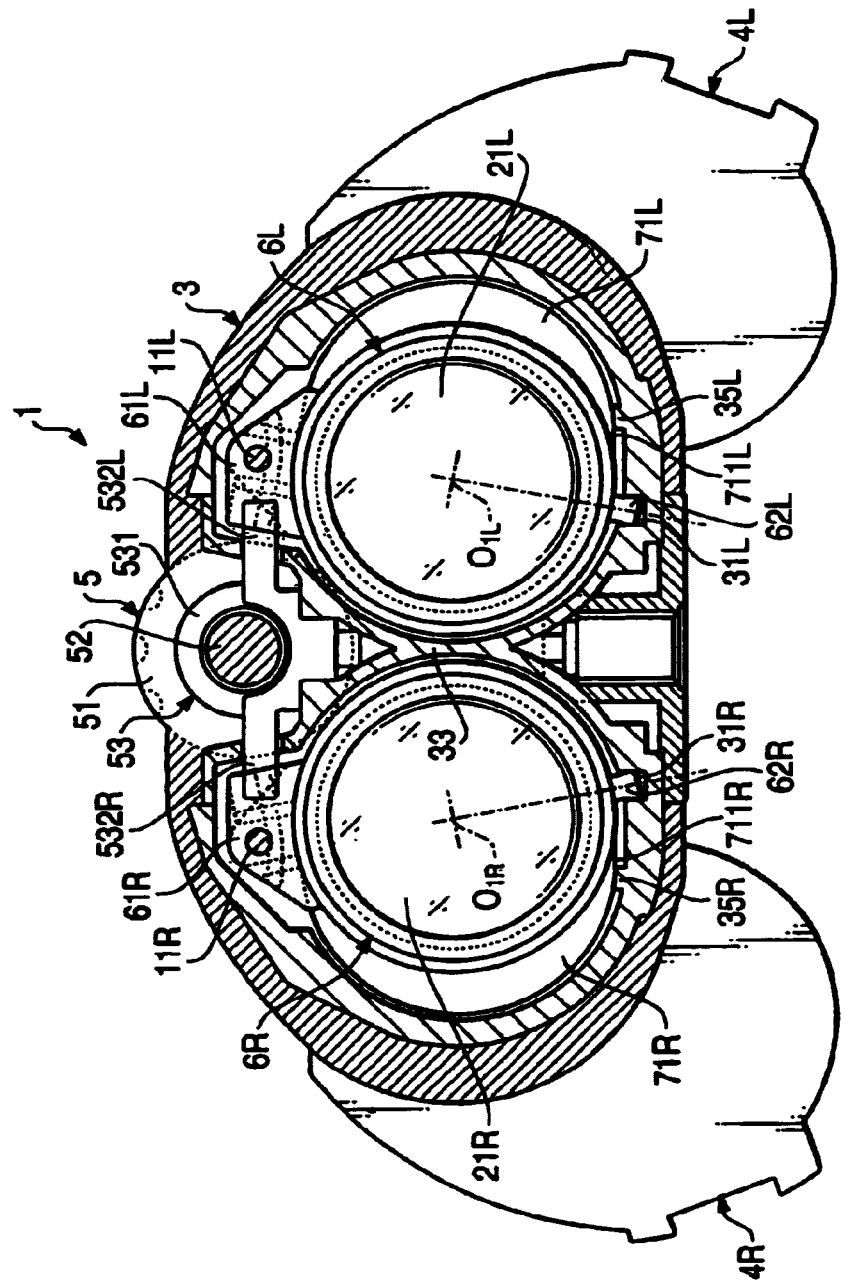
FIG. 6 is a sectional front view of the binoculars according to the first embodiment of the invention in a shortest distance focused state.
Figure 7:
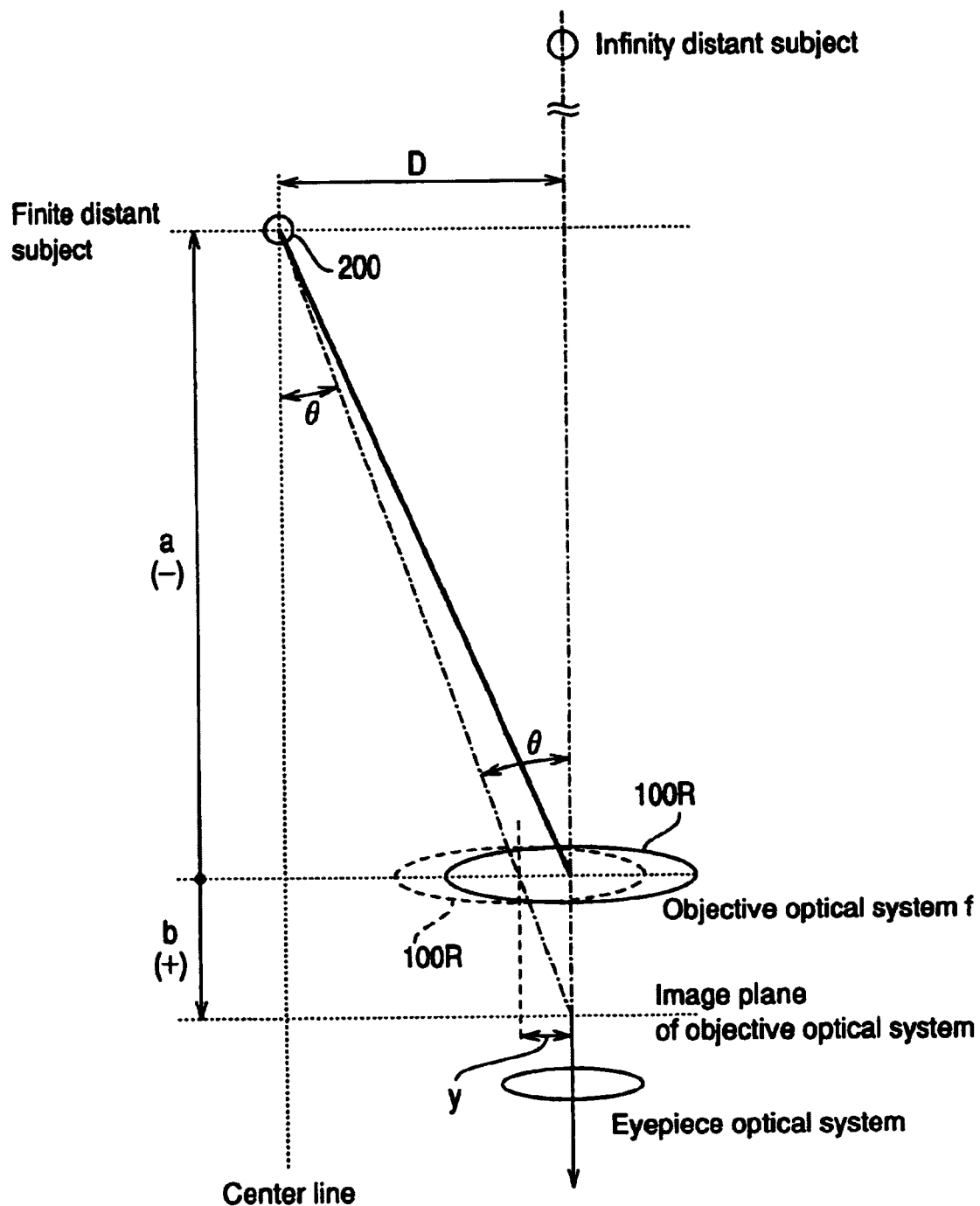
FIG. 7 is an exemplary view showing displacement amounts of the objective optical systems, which are necessary for convergence value compensation.

FIG. 1, FIG. 2 and FIG. 3 are cross-sectional plan view, cross-sectional side view and cross-sectional front view of binoculars according to a first embodiment of the invention when the binoculars are focused on an object at infinity (hereinafter, the state will be referred to as the "infinity focused state"). FIG. 4, FIG. 5 and FIG. 6 are a sectional plan view, a sectional side view and a sectional front view when the binoculars according to the first embodiment of the invention are focused to an object at its shortest distance (hereinafter, the state will be referred to as the "shortest distance focused state"). FIG. 7 is an exemplary view showing displacement amounts of objective optical systems necessary to compensate for a convergence value.

It should be noted that, in this specification, the upper side in FIG. 1 and the left-hand side in FIG. 2 are referred to as a "front" side of the binoculars, the lower side in FIG. 1 and the right-hand side in FIG. 2 are referred to as a "rear" side of the binoculars 1, the upper side in FIG. 2 and FIG. 3 is referred to as the "up or upside" and the lower side therein is referred to as the "down or downside" of the binoculars 1.

As shown in FIG. 1, the binoculars 1 include an observation optical system 2L for the left eye, an observation optical system 2R for the right eye, a main body 3 which is a casing for accommodating the above-described observation optical systems, a left barrel 4L and a right barrel 4R, and a focusing mechanism 5 used for focusing in accordance with an object distance.

The observation optical systems 2L and 2R have objective optical systems 21L and 21R, erecting optical systems 22L and 22R and eyepiece optical systems 23L and 23R, respectively. The erecting optical systems 22L and 22R in the observation optical systems 2L and 2R include Porro prisms, respectively. A predetermined gap (spacing) is formed between the incidence side optical axes $O_{21L}$ and $O_{21R}$ of the eyepiece optical systems 23L and 23R with respect to the erecting optical systems 22L and 22R and the emission side optical axes $O_{22L}$ and $O_{22R}$ thereof. In the infinity focused state, the optical axes $O_{1L}$ and $O_{1R}$ of the objective optical systems 21L and 21R coincide with the incidence side optical axes $O_{21L}$ and $O_{21R}$, respectively.

Both the objective optical systems 21L and 21R are integrally installed in the main body 3. The left side eyepiece optical system 23L and erecting optical system 22L, and the right side eyepiece optical system 23R and erecting optical system 22R are installed in the left barrel 4L and right barrel 4R which are separated from each other. The main body 3, left barrel 4L and right barrel 4R may include a single part or may be composed of a plurality of combined parts.

The left barrel 4L and right barrel 4R are coupled to the main body 3 so as to turn within a predetermined angular range about the incidence side optical axes $O_{21L}$ and $O_{21R}$, respectively. Further, the barrels 4L and 4R can be held at any positions within the predetermined angular range by friction.

By turning the left barrel 4L and right barrel 4R in opposite directions, the distance between the optical axes $O_{2L}$ and $O_{2R}$ (distance between the emission side optical axes $O_{22L}$ and $O_{22R}$) of both the eyepiece optical systems 23L and 23R can be adjusted to meet the width between the eyes of the observer. It is preferable that the binoculars 1 are provided with an interlock mechanism (not illustrated) by which the left barrel 4L and right barrel 4R turn in opposite directions simultaneously with each other.

In the composition as illustrated, a cover glass 12 is provided in the window part opening forward of the main body 3. With this configuration, foreign substances or dusty substances are prevented from entering the main body 3. The cover glass 12 may be omitted.

At the rear end portions of the barrels 4L and 4R, eyepiece members 13L and 13R are secured concentrically with the eyepiece optical systems 23L and 23R, respectively. The eyepiece members 13L and 13R are displaceable in the directions of the optical axes $O_{2L}$ and $O_{2R}$, that is, movable from the accommodated state shown in FIG. 1 to a state (not illustrated) where the eyepiece members 13L and 13R are drawn rearward. The user adjusts the positions of the eyepiece members 13L and 13R depending on the presence/absence of glasses or facial features, and then looks into the eyepiece optical systems 23L and 23R circumocularly or with his/her glasses abutted against the rearward end surface of the eyepiece members 13L and 13R. With this configuration, the user can place his/her eyes at appropriate eye points (the positions where all the fields of view can be seen without being shielded) in a stable state.

The objective optical systems 21L and 21R are made movable with respect to the main body 3, and are moved by actuation of the focusing mechanism 5. As shown in FIG. 2 and FIG. 3, the main body 3 is provided with a pair of guide shafts 11L and 11R and guide grooves (guide rails) 31L and 31R for guiding movement of the objective optical systems 21L and 21R, respectively.

Each of the guide shafts 11L and 11R is composed of a straight rod. The guide shafts 11L and 11R are arranged on the upper side of the objective optical systems 21L and 21R, extending in parallel with the optical axes $O_{1L}$ and $O_{1R}$. As shown in FIG. 3, protruded portions 61L and 61R formed on the upside portions of the lens frames 6L and 6R for retaining the objective optical systems 21L and 21R have holes, through which the guide shafts 11L and 11R are inserted. With this configuration, the objective optical systems 21L and 21R are movable along the guide shafts 11L and 11R, and are turnable about the guide shafts 11L and 11R, respectively.

The guide rails 31L and 31R include grooves formed on the inner wall on the lower side of the main body 3. Projections (engagement portions) 62L and 62R, which are inserted into the guide grooves 31L and 31R, are formed downward portions of the lens frames 6L and 6R. As the objective optical systems 21L and 21R are moved along the guide shafts 11L and 11R, the projections 62L and 62R are moved along the guide grooves 31L and 31R, respectively.

As shown in FIG. 1, the focusing mechanism 5 includes a turning ring (focusing ring) 51 which serves as an operable member, a focusing ring shaft 52 which turns along with the focusing ring 51 and a vane 53. Both the focusing ring 51 and focusing ring shaft 52 are located between the observation optical systems 2L and 2R in the plan view and are rotatably supported on the main body 3. The vane 53 is provided with a base portion 531 having a female thread which is engaged with a male thread formed on the outer circumferential surface of the focusing ring shaft 52. The vane 53 is further provided with arms 532L and 532R protruding leftward and rightward from the proximal portion 531, respectively. The tip end portions of the arms 532L and 532R are inserted into grooves formed in the protruded portions 61L and 61R of the lens frames 6L and 6R.

If the focusing ring 51 is rotated in a predetermined direction, the proximal portion 531 advances along the direction where the focusing ring shaft 52 extends. Then, the force is transmitted to the lens frames 6L and 6R via the arms 532L and 532R to cause the objective optical systems 21L and 21R to protrude forward. If the focusing ring 51 is turned in the direction opposite to the predetermined direction, the objective optical systems 21L and 21R are caused to be retracted rearward. With such actuation of the focusing mechanism 5, focusing can be carried out.

In the infinity focused state shown in FIG. 1 and FIG. 3, the objective optical systems 21L and 21R are in a rearward retracted state (i.e., fully retracted rearward).

To the contrary, in the shortest distance focused state shown in FIG. 4 through FIG. 6, the objective optical systems 21L and 21R are fully protruded forward. The shortest focusing distance of the binoculars 1 can be obtained in this state. The shortest focusing distance is not limited to a specific value. However, as described below, since the binoculars 1 according to the invention are provided with a convergence value compensation mechanism and are suitable for short distance observation, it is preferable that the shortest focusing distance is relatively short in comparison with conventional binoculars, which distance is, for example, 0.3 m through 1 m in range.

The binoculars 1 are provided with a convergence value compensation mechanism for compensating for the convergence value by varying the distance between the optical axes $O_{1L}$ and $O_{1R}$ of the objective optical systems 21L and 21R in association with the operation of the focusing mechanism 5. In the first embodiment, the convergence value compensation mechanism includes the guide shafts 11L and 11R, guide rails (grooves) 31L and 31R and projections 62L and 62R as described above. Hereinafter, a description is given of compensation for the convergence value in the binoculars 1 according to the first embodiment.

As shown in FIG. 4, the guide rails (grooves) 31L and 32R are provided with inclined portions 311L and 311R extending along a direction inclined with respect to the optical axes $O_{1L}$ and $O_{1R}$ of the objective optical systems 21L and 21R, and parallel portions 312L and 312R continuously formed rearward of the inclined portions 311L and 311R and extending in parallel to the optical axes $O_{1L}$ and $O_{1R}$, respectively. The inclined portions 311L and 311R are inclined such that the inclined portions 311L and 311R become closer to each other toward the forward direction. Markers 32L and 32R indicating the positions of the objective optical systems 21L and 21R in the infinity focused state are provided sideward at a predetermined position along the parallel portions 312L and 312R.

When the projections 62L and 62R are located at the parallel portions 312L and 312R, even if the focusing mechanism 5 is operated and the objective optical systems 21L and 21R are moved, the distance between the optical axes $O_{1L}$ and $O_{1R}$ does not change. That is, no convergence value compensation is effected in the vicinity of the infinity focused state. It is because, when observing an object at a relatively far distance, the convergence value correction is unnecessary.

When the projections 62L and 62R are located at the inclined portions 311L and 311R, as the focusing mechanism 5 is operated and objective optical systems 21L and 21R is advanced, the projections 62L and 62R approach the center along the inclined portions 311L and 311R, respectively. Thus, the objective optical systems 21L and 21R are rotated about the guide shafts 11L and 11R, respectively, and the distance between the optical axes $O_{1L}$ and $O_{1R}$ is gradually reduced, thereby the convergence value being compensated for (see FIG. 3 and FIG. 6).

Since the convergence value is compensated as described above, a difference between an image observed by the left eye and an image observed by the right eye when observing a short distance object can be prevented, and the observation becomes easy and comfortable.

Although there is no special limitation with respect to the focusing distance (adjustment value) at which convergence value compensation is effected, it is preferable that the distance is 3 m through 5 m. The boundary points between the inclined portions 311L and 311R and the parallel portions 312L and 312R in the guide rails 31L and 31R are set at positions corresponding to the focusing distance at which the convergence value compensation is effected.

As described above, in the binoculars 1 according to the first embodiment, an objective optical system turning method is employed, in which the distance between the optical axes $O_{1L}$ and $O_{1R}$ is varied by turning the objective optical systems 21L and 21R centering around the guide shafts 11L and 11R when compensating for the convergence value. It should be noted that the objective optical systems 21L and 21R are not translated (i.e., moved in parallel) in the right and left directions. Therefore, the structure can be simplified, which contributes to a decrease in the number of components and facilitation of assembling process, thereby the manufacturing costs thereof being reduced.

As described above, in the binoculars 1 according to the invention, an object turning system is employed, in which the distance between the optical axes $O_{1L}$ and $O_{1R}$ is varied by turning the objective optical systems 21L and 21R centering around the guide shafts 11L and 11R when correcting the convergence value, wherein the objective optical systems 21L and 21R are not moved in parallel in the left and right directions. Therefore, the structure can be simplified. This contributes to a decrease in the number of components and facilitation of assembling, wherein the production costs thereof can be reduced.

Such binoculars 1 are provided with light shielding mechanism for preventing light (stray light) from entering through a clearance produced in accordance with displacement of the object optical systems 21L and 21R by convergence value correction. In this embodiment, the light shielding mechanism includes shielding plates 71L and 71R operating as light shielding members and a partitioning wall 33 secured in the main body 3.

As shown in FIG. 4, the light shielding plate 71L is installed so as to protrude from the left side portion of the lens frame 6L, and the light shielding plate 71R is installed so as to protrude from the right side portion of the lens frame 6R. That is, the light shielding members 71L and 71R are members that are displaced along with the objective optical systems 21L and 21R. As shown in FIG. 6, the light shielding plates 71L and 71R are almost crescent moon-shaped. In addition, the light shielding plates 71L and 71R may be formed integral with the lens frames 6L and 6R or may be formed by separate members and are fixed to the lens frames 6L and 6R by an adhering method, etc.

Such light shielding plates 71L and 71R function as outside light shielding portions for preventing stray light from entering the observation optical systems 2L and 2R through clearances 800L and 800R produced outside both objective optical systems 21L and 21R when facing in the directions of the optical axes $O_{1L}$ and $O_{1R}$ where the distance between the optical axes $O_{1L}$ and $O_{1R}$ of the objective optical systems 21L and 21R is comparatively small. That is, as the distance between the optical axes $O_{1L}$ and $O_{1R}$ is made short as in the shortest distance focused state shown in FIG. 4, clearances 800L and 800R are produced between the lens frames 6L and 6R and the inner wall of the main body 3. However, as has been understood in FIG. 4, the clearances 800L and 800R are closed by providing the light shielding plates 71L and 71R, wherein it is possible to prevent stray light from entering the observation optical systems 2L and 2R. Therefore, since flares resulting from stray light can be prevented from occurring, it is possible to prevent adverse effects such as a lowering in the contrast of an observation image, and satisfactory image formation of the binoculars 1 can be maintained.

Also, although it is simply considered when viewing FIG. 4 that, if the positions of the left and right edge portions 34L and 34R of the forward opening of the main body 3 are extended inwardly until the edge portions 3L and 3R overlap the lens frames 6L and 6R, the light shielding plates 71L and 71R are not required, this is not true. If the positions of the edge portions 34L and 34R are extended inwardly from the position thereof in FIG. 4, the edge portions 34L and 34R are caused to interfere with the incident light paths to the objective optical systems at the infinity focused state shown in FIG. 1, wherein the outside of the viewing field is vignetted and is lost.

To the contrary, since, in the present embodiment, the outside light shielding portions are formed of light shielding plates 71L and 71R that are displaced along with the objective optical systems 21L and 21R, it is possible to prevent vignetting from occurring in the vicinity of the infinity focused state while preventing stray light from entering in the vicinity of the shortest distance observation state.

As shown in FIG. 6, the light shielding plates 71L and 71R have arc (i.e. circular arc) shape portions 711L and 711R in the vicinity of the farthest position from the guide shafts 11L and 11R, that is, in the vicinity of the lower end portions thereof. The outer circumferential shape of the arc shape portions 711L and 711R is made circular centering around the guide shafts 11L and 11R. Receiving portions 35L and 35R are formed so as to protrude from the portions of the inner wall of the main body 3, which are faced to the arc shape portions 711L and 711R. The top surfaces of the receiving portions 35L and 35R are made circular centering around the guide shafts 11L and 11R when facing in the directions of the optical axes $O_{1L}$ and $O_{1R}$, and the arc shape portions 711L and 711R are brought into contact with or in proximity to the top surfaces. And, as the objective optical systems 21L and 21R turn centering around the guide shafts 11L and 11R by correction of the convergence value, the arc shape portions 711L and 711R slide with respect to the receiving portions 35L and 35R.

In the present embodiment, since the arc shape portions 711L and 711R are provided as described above, clearances with respect to the receiving portions 35L and 35R can be made almost zero, wherein it is possible to securely prevent flare from occurring due to intrusion of stray light. In addition, where the arc shape portions 711L and 711R are brought into contact with the receiving portions 35L and 35R, such a function can be obtained, by which the lens frames 6L and 6R can be supported in a further stable state. Therefore, the positional accuracy of the objective optical systems 21L and 21R can be improved, and a further higher optical accuracy can be brought about.

As shown in FIG. 1 and FIG. 4, the partitioning wall 33 is provided inside the main body 3 so that the spacing in which the left side objective optical system 21L (lens frame 6L) moves and spacing in which the right side objective optical system 21R (lens frame 6R) moves are separated from each other. The partitioning wall 33 is shaped so that the width thereof increases from forward to backward.

Such a partitioning wall 33 functions as an inside light shielding portion for preventing stray light from entering through a clearance 900 produced between the objective optical systems 21L and 21R, when facing in the directions of the optical axes $O_{1L}$ and $O_{1R}$, where the distance between the optical axes $O_{1L}$ and $O_{1R}$ of the objective optical systems 21L and 21R is comparatively large. That is, as the distance between the optical axes $O_{1L}$ and $O_{1R}$ is increased as in the infinity focused state shown in FIG. 1, the clearance 900 is produced between the lens frames 6L and 6R. However, as has been understood in FIG. 1, since the partitioning wall 33 is provided, the gap 900 is closed, and it is possible to prevent stray light from entering the main body 3. Therefore, since flare can be prevented from occurring due to stray light, adverse effects such as a lowering in the contrast of an observation image can be prevented, and satisfactory image formation in the binoculars 1 can be maintained. On the other hand, since the partitioning wall 33 is shaped so that the width thereof is made narrow from backward to forward, as shown in FIG. 4, the partitioning wall 33 is shaped so that approaching of both objective optical systems 21L and 21R to each other can be permitted.

As shown in FIG. 1, the binoculars 1 according to the first embodiment are configured such that, in use, the distance between the optical axes $O_{1L}$ and $O_{1R}$ of the objective optical systems 21L and 21R is always shorter than the distance between the optical axes $O_{2L}$ and $O_{2R}$ of the eyepiece optical systems 23L and 23R (distance between the emission side optical axes $O_{22L}$ and $O_{22R}$). In other words, the maximum value of the distance between the optical axes $O_{1L}$ and $O_{1R}$ of the objective optical systems 21L and 21R (the state shown in FIG. 1) is made smaller than the distance between the optical axes $O_{2L}$ and $O_{2R}$ of the eyepiece optical systems 23L and 23R (the distance between the emission side optical axes $O_{22L}$ and $O_{22R}$) in a state where the eye-width distance is adjusted to the minimum value (however, this refers to a state usable as binoculars and does not include an unusable, fully retracted state).

With such a configuration, in comparison with a roof prism type binoculars in which the distance between optical axes of both objective optical systems is equal to the distance between the optical axes of both eyepiece optical systems, and binoculars (Zeiss type and Bausch & Lomb type binoculars) in which the distance between the optical axes of both objective optical systems is larger than the distance between the optical axes of both eyepiece optical systems, a displacement amount of the objective optical systems 21L and 21R necessary for compensating for the convergence value can be smaller. The reason will be described below with reference to FIG. 7.

In FIG. 7, only the right side optical system is illustrated. Although omitted, the left side optical system has the same configuration as the right side one. In FIG. 7, the position of the right side objective optical system 100R for observing an object at the infinity is shown by a solid line. The objective optical system 100R is moved closer to the center line of the binoculars in order to observe an object 200 at a finite distance a (adjustment value: a<0) from the objective optical system 100R in a state where the convergence value is compensated, and it is necessary that the objective optical system 100R is to be moved to the position indicated by a broken line. In this case, the movement distance y of the objective optical system 100R, which is obtained from FIG. 7 and an image formation formula 1/b=1/a+1/f, is represented by an expression below:

$$y = b \times \tan\theta$$
$$= \{f \times a/(a+f)\} \times \tan\theta$$
$$= \{f \times a/(a+f)\} \times D/(-a+b)$$
$$= D \times [f \times a/(a+f)/\{-a+f \times a/(a+f)\}],$$

where, f represents the focusing distance of the objective optical system 100R, 2D represents the distance between the optical axes of both objective optical systems, 2θ represents a convergence angle, b denotes the distance from the objective optical systems to the image forming position of an object 200 by the objective optical system 100R (b>0).

That is, the movement distance y of the objective optical system 100R necessary to compensate for the convergence value is increased in proportion to D. In other words, as the distance between the optical axes of both objective optical systems is shorter, the displacement value of the objective optical systems necessary to compensate for the convergence value can be decreased.

In the binoculars 1 according to the first embodiment, since the distance between the optical axes $O_{1L}$ and $O_{1R}$ of the objective optical systems 21L and 21R is small, as described above, it is sufficient to move the objective optical systems 21L and 21R only slightly in the direction perpendicular to the optical axes $O_{1L}$ and $O_{1R}$ to compensate for the convergence value. Therefore, it is possible to incorporate a convergence value compensating mechanism without increasing the scale of the main body 3, and the entire binoculars 1 can be made compact.

Second Embodiment

Figure 8:
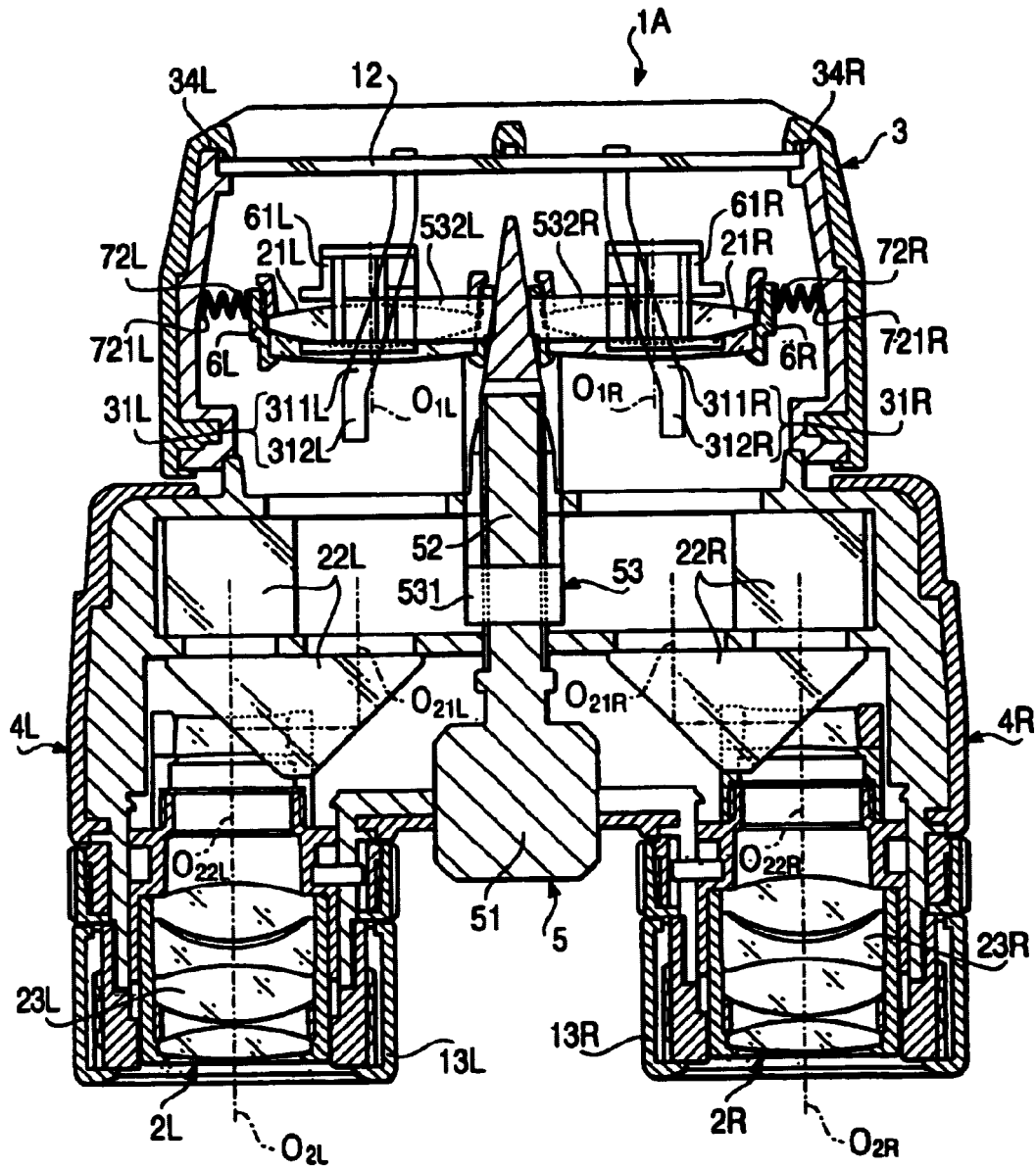
FIG. 8 is a cross-sectional plan view of binoculars according to a second embodiment.

FIG. 8 is a sectional plan view showing binoculars 1A according to a second embodiment of the invention. Hereinafter, a description is given of the second embodiment of the binoculars according to the invention on the basis of the same drawing. The description is given mainly of points differing from the first embodiment, and the description of the parts similar to those in the first embodiment is omitted.

As shown in FIG. 8, in the binoculars 1A according to the second embodiment, the light shielding members 72L and 72R that constitute the outside light shielding portion are formed of a retractable bellow-shaped (accordion-shaped) member. The end portions 721L and 721R at the side opposite the side, which is fixed at the lens frame 6L and 6R, of the light shielding member 721L and 721R are in contact with the inner wall of the main body 3. As the objective optical systems 21L and 21R (lens frames 6L and 6R) move, the end portions 721L and 721R slide along the inner wall of the main body 3.

With such a construction, in this embodiment, since the clearance between the end portions 721L and 721R of the light shielding members 72L and 72R and the inner wall of the main body 3 can be made almost zero, it is possible to further securely prevent stray light from entering the observation optical systems 2L and 2R. Therefore, since flare can be further securely prevented from occurring due to stray light, adverse effects such as a lowering in the contrast of an observation image can be further securely prevented, wherein satisfactory image formation can be further securely maintained in the binoculars 1A.

Also, since the projections 62L and 62R are pressed to the inner surface (side surface) of the guide rails 31L and 31R by a restoration force (an extension force) of the light shielding members 72L and 72R, it is possible to eliminate play of the lens frames 6L and 6R in the left and right directions. Therefore, since the object optical systems 21L and 21R can be further accurately moved, an optical accuracy such as convergence value correction accuracy can be improved.

Third Embodiment

Figure 9:
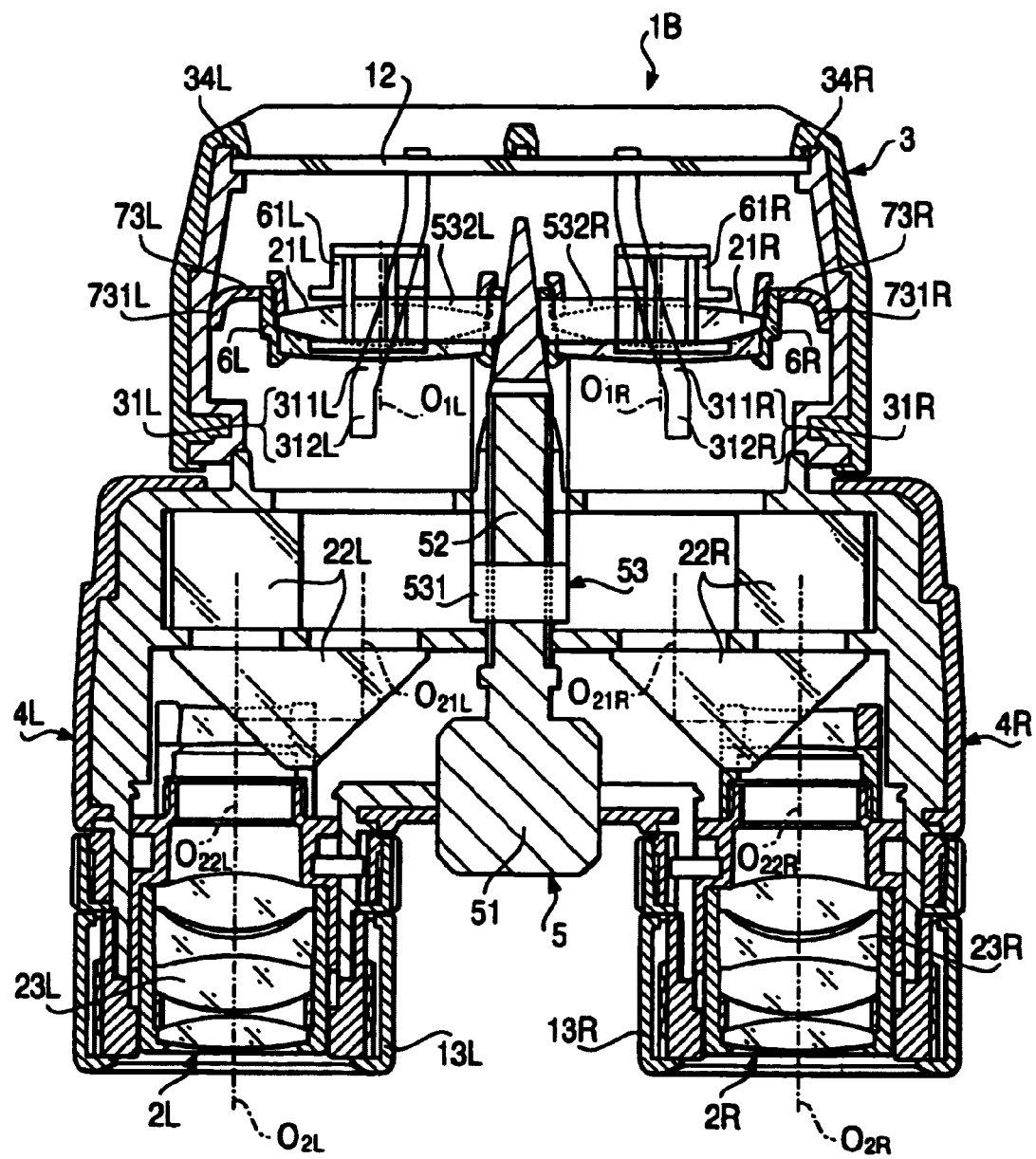
FIG. 9 is a cross-sectional plan view of binoculars according to a third embodiment.

FIG. 9 is a sectional plan view showing binoculars 1B according to a third embodiment of the invention. Hereinafter, on the basis of the same drawing, a description is given of the third embodiment. However, the description is given mainly of points differing from the first embodiment described. A description of the parts which are similar to those of the firs embodiment is omitted.

As shown in FIG. 9, in the binoculars 1B according to the third embodiment, the light shielding members 73L and 73R that constitute the outside light shielding portion are formed of a resilient member such as, for example, a rubber-based material. The light shielding members 73L and 73R are plate-shaped. Curved portions 731L and 731R curved backward are formed at the end portion opposite the side, which is fixed at the lens frames 6L and 6R, of the light shielding members 73L and 73R. The curved portions 731L and 731R are in contact with the inner wall of the main body 3, wherein as the objective optical systems 21L and 21R (lens frame 6L and 6R) move, the curved portions 731L and 731R slide along the inner wall of the main body 3.

With such a construction, in this embodiment, since the clearance between the curved portions 731L and 731R of the light shielding members 73L and 73R and the inner wall of the main body 3 can be made almost zero, it is possible to further securely prevent stray light from entering the observation optical systems 2L and 2R. Therefore, since flare can be further securely prevented from occurring due to stray light, adverse effects such as a lowering in the contrast of an observation image can be further securely prevented, wherein satisfactory image formation can be further securely maintained in the binoculars 1B.

In addition, since the projections 62L and 62R are pressed to the inner surface (side surface) of the guide rails 31L and 31R by a force by which the light shielding members 73L and 73R (particularly, the curved portions 731L and 731R) are caused to extend by resiliency, play of the lens frames 6L and 6R in the left and right directions can be eliminated. Therefore, since the objective optical systems 21L and 21R can be further accurately moved, an optical accuracy such as convergence value correction accuracy can be improved.

As described above, a description was given of the illustrated embodiment of binoculars according to the invention. However, the invention is not limited thereto. Respective components that compose the binoculars may be substituted by any optional components which are capable of displaying performance similar thereto.

For example, in the illustrated embodiments, although the guide rails are formed of grooves (guide grooves), such a construction may be employed, in which the guide rails are formed of convex lines, and the lens frames are provided, as engagement portions, with grooves into which the convex lines are inserted. Also, as in the second and third embodiments, where pressing members are provided by which the projections secured in the lens frames are pressed to the side surfaces of the guide rails, the guide rails may be constructed of gaps.

Also, in the illustrated embodiments, a description was given of such a construction in which the distance between optical axes is varied by turning and moving both objective optical systems. However, such a construction may be employed, in which the distance between optical axes is varied by moving both object optical systems in parallel to the direction orthogonal to the optical axes.

In addition, in the illustrated embodiments, the object optical systems are, respectively, composed of one lens group (the group including two lenses), wherein the lens group that is moved by a focusing action and a lens group for convergence value adjustment are completely concurrently used. However, for example, in a case where the objective optical systems include more lens groups, such a construction may be employed, in which lens groups are separately applied to the focusing action and convergence value adjustment, or a part thereof can be concurrently used, and it is theoretically possible that the focusing action is carried out by optical members included in other than the objective optical systems.

In addition, the binoculars according to the invention are not limited to a construction by which the convergence value is corrected by varying the distance between optical axes of both the objective optical systems. For example, such a construction may be employed, by which the convergence value is corrected by inclining the optical axes of the respective objective optical systems (respective object displacement elements).

The present disclosure relates to the subject matter contained in Japanese Patent Application No. 2004-032566, filed on Feb. 9, 2004, which is expressly incorporated herein by reference in its entirety.

What is claimed is:

1. Binoculars which include a pair of observation optical systems each having an objective optical system, an erecting optical system and an eyepiece optical system, the binoculars comprising:

a focusing mechanism that is used to move a part of observation optical systems for focusing;

a convergence value compensating mechanism that compensates for a convergence value by displacing displaceable optical elements which are at least parts of the objective optical systems, respectively, in association with actuation of the focusing mechanism; and a light shielding mechanism configured to shield light for preventing light from entering through a clearance caused in accordance with displacement of the displaceable optical elements by actuation of the convergence value compensating mechanism;

wherein the focusing mechanism is configured to carry out focusing by moving the pair of displaceable optical elements, wherein the binoculars further includes:

a pair of guide shafts corresponding to the pair of displaceable optical elements, the pair of guide shafts being arranged in parallel with the corresponding displaceable optical elements, the pair of guide shafts guiding the corresponding displaceable optical elements when moved by actuation of the focusing mechanism, the pair of guide shafts serving as turning centers of the corresponding displaceable optical elements, respectively;

a pair of engaging portions formed on a pair of frames that hold the pair of displaceable optical elements, respectively; and a pair of guide rails provided with respect to the pair of displaceable optical elements, respectively, the pair of engaging portions being slidably engaged with the pair of guide rails, respectively, the pair of guide rails having inclined portions that incline with respect to the optical axes of the pair of displaceable optical elements at least parts thereof, respectively, wherein, when the pair of displaceable optical elements are moved for focusing with the pair of engaging portions being engaged with the inclined portions of the pair of guide rails, respectively, the pair of displaceable optical elements turn about the pair of guide shafts, respectively, and a distance between the optical axes of the pair of displaceable optical elements changing as the pair of displaceable optical elements turn, whereby the convergence value is compensated;

further comprising a main body that accommodates the displaceable optical elements, wherein the light shielding mechanism includes light shielding members, which are respectively displaced along with the displaceable optical elements, for preventing light from entering through the clearance produced outside each of the displaceable optical elements, when facing in a direction parallel to an optical axis direction of the displaceable optical elements, in a state in which the distance between the optical axes of the displaceable optical elements is comparatively small, and wherein each of the light shielding members includes an arc shape portion, whose outer circumferential shape has a form of an arc centering around the corresponding guide axis, in the vicinity of the farthest position from the corresponding guide axis, and the arc shape portion is brought into contact with or is in proximity to an inner wall of the main body.

2. The binoculars according to claim 1, wherein the convergence value compensating mechanism compensates for the convergence value by varying a distance between optical axes of the displaceable optical elements, and wherein the light shielding mechanism includes an outside light shielding portion that prevents light from entering through the clearance, the clearance being produced outside each of the displaceable optical elements, when facing in an optical axis direction of the displaceable optical elements, in a state in which the distance between the optical axes of the displaceable optical elements is comparatively small.

3. The binoculars according to claim 2, wherein the outside light shielding portion includes a light shielding member configured to be displaced along with the displaceable optical elements.

4. The binoculars according to claim 3, further comprising a main body that accommodates the displaceable optical elements, wherein the light shielding member includes a resilient body and is installed in contact with an inner wall of the main body.

5. The binoculars according to claim 3, further comprising a main body that accommodates the displaceable optical elements, wherein the light shielding member includes a bellow-shaped member and is installed in contact with an inner wall of the main body.

6. The binoculars according to claim 1, wherein the convergence value compensating mechanism compensates for the convergence value by varying a distance between optical axes of the displaceable optical elements, and wherein the light shielding mechanism includes an inside light shielding portion that prevents light from entering through the clearance, the clearance being produced between the displaceable optical elements, when facing in an optical axis direction of the displaceable optical elements, in a state in which the distance between the optical axes of the displaceable optical elements is comparatively large.

7. The binoculars according to claim 6, further comprising an integrated main body that accommodates the displaceable optical elements, wherein the inside light shielding portion includes a partition provided in the integrated main body, the displaceable optical elements being separated by the partition in spacing in which both the displaceable optical elements are displaced.

8. The binoculars according to claim 1, wherein each of the pair of observation optical systems is configured such that an incidence side optical axis with respect to the erecting optical system and an emission side optical axis of the eyepiece optical system are shifted from each other by a predetermined distance, wherein the binoculars further include:

a main body that accommodates the displaceable optical elements;

a left barrel containing the left eyepiece optical system and the left erecting optical system, the left barrel being turnable, with respect to the main body, about the left incidence side optical axis of the eyepiece optical system; and a right barrel containing the right eyepiece optical system and the right erecting optical system, the right barrel being turnable, with respect to the main body, about the right incidence side optical axis of the eyepiece optical system, and wherein the distance between the emission side optical axes of the pair of eyepiece optical systems is made adjustable by turning the left barrel and right barrel with respect to the main body.

* * * * *